US009823804B2

(12) United States Patent
Ghotgalkar et al.

(10) Patent No.: US 9,823,804 B2
(45) Date of Patent: Nov. 21, 2017

(54) UNIFIED USER INTERFACE FRAMEWORK FOR CREATING CONFIGURABLE WEB-PORTALS USING MENU OPTIONS

(75) Inventors: Durgesh Ramchandra Ghotgalkar, Pune (IN); Ameya Suresh Mainkar, Mumbai (IN); Ravindran Nesaraj, Tuticorin (IN); Rajendra Kumar Lakshmana Moorthy Gari Kadiri, Bangalore (IN)

(73) Assignee: Infosys Limited, Bangalore (IN)

( * ) Notice: Subject to any disclaimer, the term of this patent is extended or adjusted under 35 U.S.C. 154(b) by 735 days.

(21) Appl. No.: 13/984,820

(22) PCT Filed: Mar. 23, 2011

(86) PCT No.: PCT/IN2011/000193
§ 371 (c)(1),
(2), (4) Date: Aug. 9, 2013

(87) PCT Pub. No.: WO2012/127481
PCT Pub. Date: Sep. 27, 2012

(65) Prior Publication Data
US 2013/0318446 A1    Nov. 28, 2013

(51) Int. Cl.
*G06F 17/00* (2006.01)
*G06F 3/0481* (2013.01)
(Continued)

(52) U.S. Cl.
CPC .............. *G06F 3/0481* (2013.01); *G06F 8/38* (2013.01); *G06F 3/0484* (2013.01); *G06F 17/3089* (2013.01)

(58) Field of Classification Search
CPC ........ G06F 3/0484; G06F 9/455; G06F 17/24; G06F 17/089
See application file for complete search history.

(56) References Cited

U.S. PATENT DOCUMENTS

2004/0027377 A1*   2/2004   Hays ................... G06F 8/38
                                                                    715/760
2005/0229154 A1*   10/2005   Hiew ................... G06F 8/34
                                                                    717/110
(Continued)

FOREIGN PATENT DOCUMENTS

WO          0025209 A1       5/2000
WO       2009050590 A2       4/2009

OTHER PUBLICATIONS

Using Web Interface Controls <URL:http://web.archive.org/web/20100531193614/http://www.uwplatt.edu/oit/howto/webinterfaces.html>, (May 31, 2010) as per Wayback Engine.
(Continued)

*Primary Examiner* — Andrew McIntosh
(74) *Attorney, Agent, or Firm* — LeClairRyan, a Professional Corporation (57) ABSTRACT

The present invention provides a method, a system, and a computer program product for configuring a Web portal for a computer-based application using one or more menus available in the computer-based application. It comprises classifying the menus available in the application according to the functionalities. The menus classified under each functionality are configured in a hierarchical structure for presenting on the Web portal corresponding to the functionality. A context bar is defined for the Web portal by defining at least one context element. Thereafter, mapping is defined for at least one field of one or more menus presented under the Web portal with one of the at least one context element. The mapping allows auto-filling of fields of an invoked menu with the value of the mapped context element, thereby reducing the manual effort of a user.

23 Claims, 9 Drawing Sheets

(51) Int. Cl.
*G06F 9/44* (2006.01)
*G06F 17/30* (2006.01)
*G06F 3/0484* (2013.01)

(56) References Cited

U.S. PATENT DOCUMENTS

2005/0257134 A1\* 11/2005 Goodman ............. G06F 17/243
　　　　　　　　　　　　　　　　　　715/226
2008/0244581 A1　10/2008 Koyama

OTHER PUBLICATIONS

International Search Report (ISA/AU) for PCT/IN2011/000193, dated Mar. 23, 2011.

\* cited by examiner

UNIFIED USER INTERFACE FRAMEWORK FOR CREATING CONFIGURABLE WEB-PORTALS USING MENU OPTIONS

This application is a national stage application under 35 U.S.C. §371 of PCT Application No. PCT/IN2011/000193, filed Mar. 23, 2011, which is hereby incorporated by reference in its entirety.

FIELD OF THE INVENTION

The present invention relates to a framework for creating Web portals for computer-based applications. More specifically, it relates to a framework for creating configurable portals using menus provided in computer-based applications.

BACKGROUND

Most of the enterprises today manage their day-to-day activities using computer-based applications. These computer-based applications are either developed by enterprises in-house or are purchased from companies that have expertise in building applications. Usually, enterprises prefer to purchase developed applications from Information Technology (IT) companies that have the expertise of developing applications. These enterprises either completely rely on IT companies or rely on IT companies for big and complex applications and develop only simpler applications in-house.

There are many reasons why enterprises prefer to purchase developed applications over developing applications in-house. One main reason is that developing applications in-house requires expertise that these enterprises often lack. If the enterprises develop applications in-house, they need to invest in hiring and maintaining experts for developing applications. This can become cumbersome and expensive, in the long run considering issues such as hiring the right experts, retaining the experts, providing adequate and continuous work to these experts, and providing training. Even after all these arrangements, enterprises often are unable to develop applications of the quality that are developed by IT companies with expertise in this field. Making the above-mentioned arrangements is not only cumbersome and expensive in the long run, but it also diverts the focus of enterprises from their main business.

IT companies usually develop applications that are applicable for multiple enterprises. For example, an ERP application is useful for many enterprises that work in different fields. Another example is a banking application which is useful for all banks. These applications are quite complex and thorough because they need to cater to different enterprises. The only limitation associated with such applications is that they are not customized according to a particular enterprise's requirements. For example, a banking application, such as Finacle® by Infosys Technologies, Ltd., has been purchased and deployed by many banks. The user interface provided in Finacle® has been created in accordance to the common requirements of different banks.

To address this limitation, enterprises customize the purchased application by taking the services of an IT company or by employing a team internally to so the same. This requires additional cost and effort. For example, the banks may need to customize the user interface of Finacle® according to their needs. Finacle® has two different user interface frameworks—Online Services (ONS) and Customer Relationship View (CRV). Therefore, the team working on the customization of the user interface in Finacle® will need to learn these two frameworks. This in turn becomes an effort intensive exercise. In addition, different applications provide different challenges which further add to the effort. Taking the example of Finacle® again, cross-reference of view-options available in ONS and CRV frameworks is not possible which adds to the complexity, of customizing the user interface.

There is a need for a solution that enables enterprises to develop user interfaces for any application without much effort and cost. There is also a need for the solution to enable the development of user interfaces without the developers needing to understand the framework or without any technical intervention in the application. Further, there is a need for the solution to allow the development of user interfaces without coding. Also, there is a need for the solution to provide features in a user interface that enables the user to navigate efficiently.

SUMMARY

The invention provides a method, a system, and a computer program product for configuring Web portal software for a computer-based application using one or more menus available in the computer-based application. The method comprises classifying the one or more menus available in the computer based application according to the functionalities. The menus classified under each functionality are configured in a hierarchical structure to present on the at least one Web portal corresponding to the functionality. A context bar is defined for the Web portal by defining at least one context element. Thereafter, the mapping is defined for at least one field of one or more menus presented under the Web portal with one of the at least one context element.

The invention also provides a method, a system, and a computer program product for using the configured Web portal. The configured Web portal is displayed to a user. Thereafter, the context bar is populated using the information provided by a customer, wherein the information is the value of the at least one context element. The user invokes a menu in the Web portal of the one or more menus presented in the Web portal, as per the user's request or query. The value of the context element is auto-filled in the at least one field of the invoked menu if the context element maps onto the field and if the auto-filling feature is enabled for the invoked menu. The invoked menu is auto-submitted to the computer-based application if all the fields auto-filled in the invoked menu form the mandatory fields of the invoked menu. In response to the auto-submission, the computer-based application provides the resulting data to the user through the Web portal. The value of one of more context elements is populated with the value of the one or more fields in the resulting data based on the mapping between the fields of the resulting data and the context elements. The user may now invoke another menu and auto-filling, auto-submitting, displaying the resulting data, and updating the context elements are iteratively repeated.

The method, the system, and the computer program product described above have a number of advantages. The system enables enterprises to develop user interfaces for any application without much effort and cost. The method enables development of user interfaces without developers needing to understand the framework or without any technical intervention in the application. Thus, the system and the method allow development of user interfaces of applications without coding. Also, the system, the method, and the computer program product allow a user to navigate efficiently between menus in the application. Another advantage associated with the present invention is that minimal input is required from the user to fill in information in menus. The auto-submitting and auto-filling features provided in the present invention support the user not only to navigate efficiently, but also to get a faster response from the application with minimal manual input. Thus, the response time to provide the required data to the customer is greatly reduced. Faster and efficient handling of customer's queries results in customer's delight and higher satisfaction, which benefits the overall business of enterprise.

BRIEF DESCRIPTION OF THE DRAWINGS

The various embodiments of the invention will hereinafter be described in conjunction with the appended drawings, provided to illustrate, and not to limit, the invention, wherein like designations denote like elements, and in which.

DETAILED DESCRIPTION OF THE INVENTION

The invention describes a method, a system, and a computer program product for configuring Web portal software for a computer-based application using one or more menus available in the computer-based application.

Figure 1:
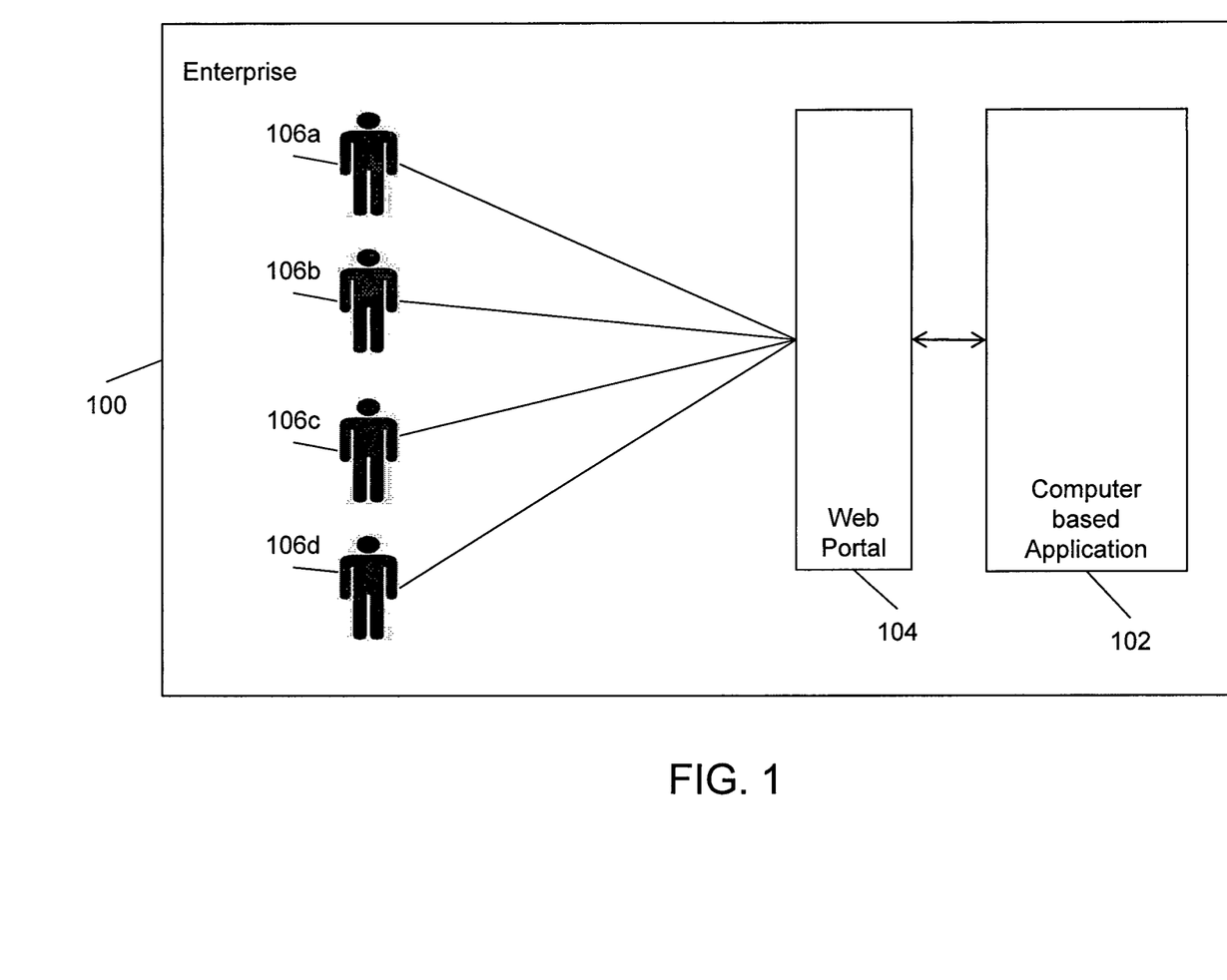
FIG. 1 illustrates an environment in which various embodiments of the invention may be practiced.

FIG. 1 illustrates an environment in which various embodiments of the invention may be practiced. An enterprise 100 includes a computer-based application 102. Computer-based application 102 can be any application that is developed by a third party and is purchased by enterprise 100. Computer-based application 102 is hereinafter referred to as application 102. For example, application 102 can be a banking application, such as Finacle® by Infosys Technologies, Ltd., that is purchased and deployed by many banks. Enterprise 100 develops a Web portal 104 for application 102, in accordance with various embodiments of the present invention. Web portal 104 is developed by enterprise 100 as per the requirements of enterprise 100. Different users in enterprise 100, represented as users 106a-d, use Web portal 104 to access application 102. For example, a bank that deploys Finacle®, provides access to the Finacle® application to multiple users 106 and these users 106 will access the Finacle® application to answer customer queries. For example, a customer may call the bank and enquire about the balance in his/her bank account and ask for a transfer of a certain amount. The user, such as user 106a, (hereinafter referred to as user 106), at the bank will access the customer's account details from Finacle® using Web portal 104 and convey the balance account information to the customer. Also, user 106 will then access Web portal 104 to conduct the transaction using Finacle®, as per the customer's request. The example of the Finacle® application is used in the description of remaining figures for clarity and consistency. The present invention should not be considered to be limited to the Finacle® application only. The present invention is applicable to other applications, such as, but not limited to, Enterprise Resource Planning (ERP) applications, Customer Relationship Management (CRM) applications, other banking applications, telephone billing applications, and other accounting applications.

Figure 2:
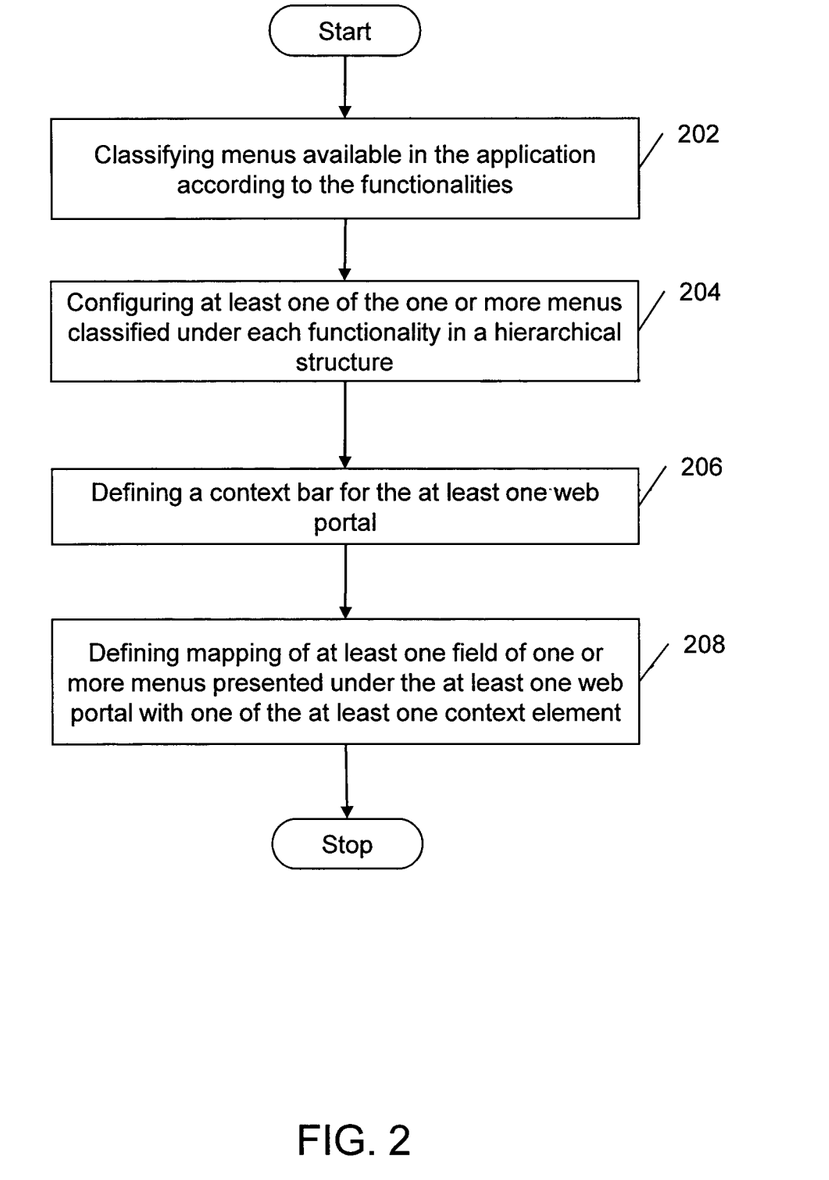
FIG. 2 is a flowchart depicting the method of developing a Web portal, in accordance to various embodiments of the present invention.
Figure 3:
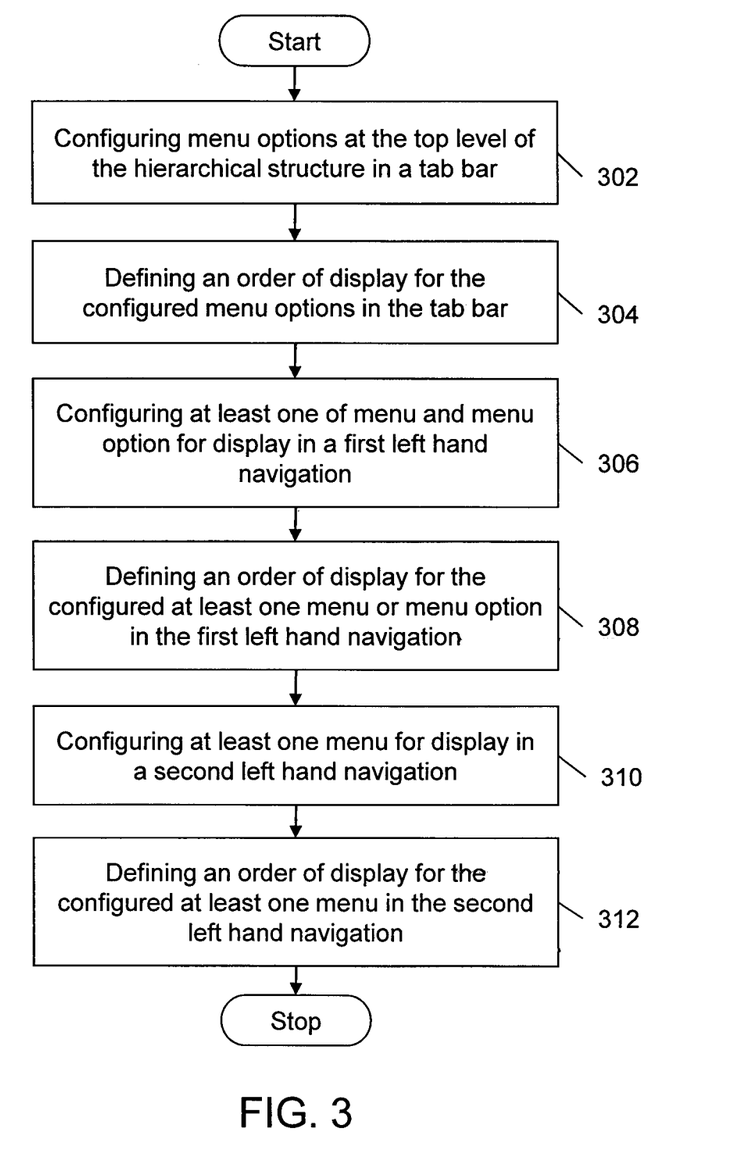
FIG. 3 is a flowchart depicting the method for configuring menus in a hierarchical structure, in accordance to various embodiments of the present invention.

The process of developing Web portal 104, in accordance to various embodiments of the present invention is discussed with reference to FIGS. 2, 3, and 4. Referring to FIG. 2, the menus available in application 102 are identified and classified according to the functionalities in application 102 at 202. For example, the menus in Finacle® can be divided into functionalities such as Deposits, Loans, and Trade Finance. At 204, the menus classified under each functionality are configured in a hierarchical structure for presenting on Web portal 104 of that functionality. The details of the configuring menus in the hierarchical structure are discussed in detail in. FIG. 3. At 206, a context bar is defined for each Web portal 104 by defining one or more context elements. Context bar maintains the context of a session initiated by user 106 by storing customer specific information using context elements. Defining of the context bar is discussed in detail in FIG. 5. At 208, mapping is defined between each context element and one or more fields of the menus of Web portal 104. At 208, it is also defined if the auto-filling feature is enabled for each of the menus configured in Web portal 104.

FIG. 3 is a flowchart depicting the method of configuring menus in a hierarchical structure, in accordance to various embodiments of the present invention. In accordance to various embodiments of the present invention, the menus are configured in a hierarchical structure with one to three levels. The three levels are top level, middle level, and bottom level. The top level in the hierarchical structure is referred to as the tab bar level. The middle level in the hierarchical structure is referred to as the First Left Hand Navigation level (First-LHN) and the bottom level in the structure is referred to as the Second Left Hand Navigation (Second-LHN) level. The hierarchical structure of the menus is shown in FIG. 4. As shown in FIG. 3, at 302, one or more menu options classified under each functionality are configured for the tab bar level in the hierarchical structure. Menu option is used to refer to a menu and a group of menus. In case it is the group of menus, then selecting the menu option provides access to menus under that menu option. At 304, the order of display for tab bar level menu options is defined. At 306, menus or menu options are configured for the first-LHN level. At 308, the order of display for the first-LHN level menus and menu options is defined. At 310, menus are configured for the second-LHN level. At 312, the order of display for the second-LHN level menus is defined.

Figure 4:
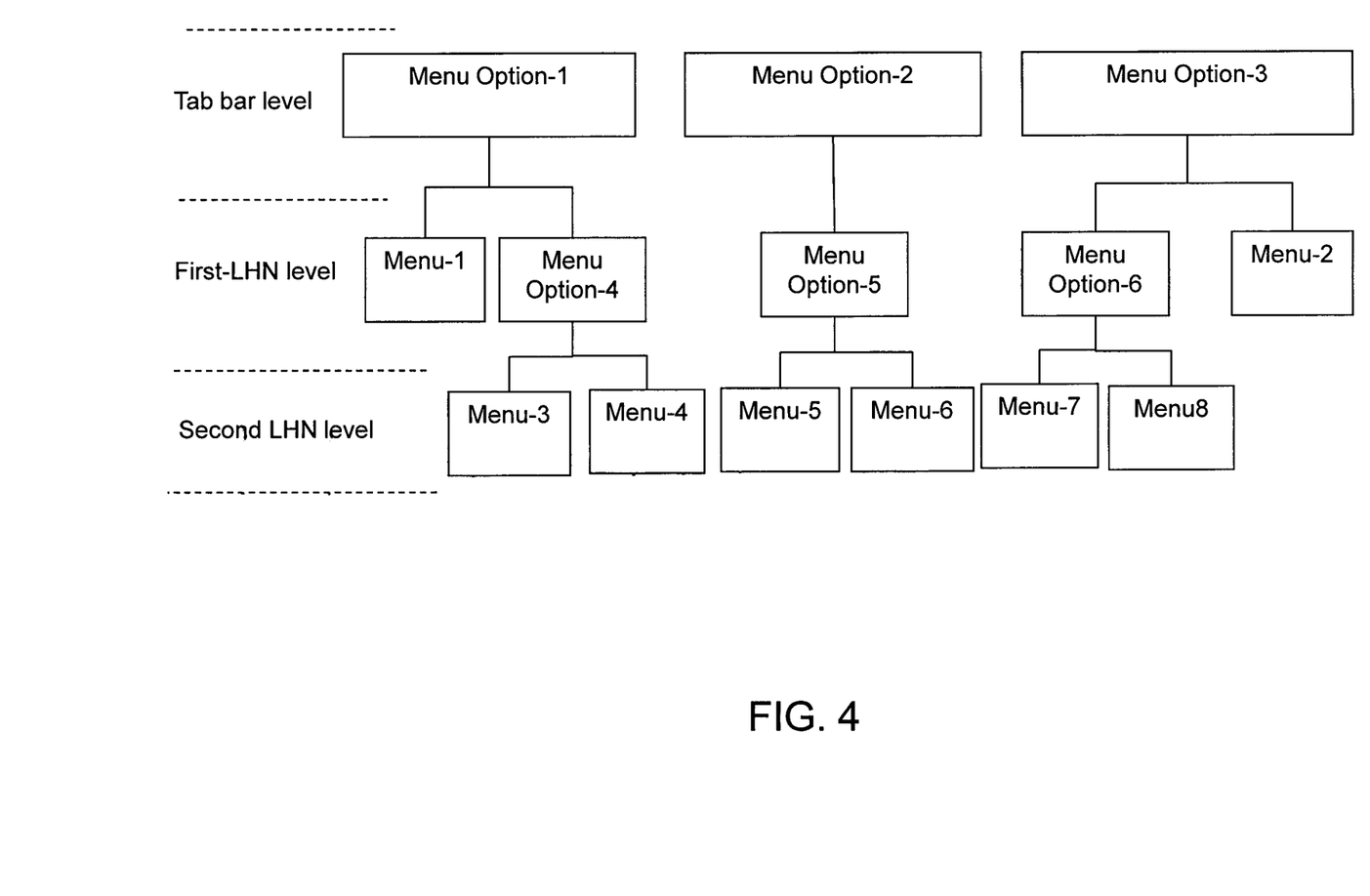
FIG. 4 shows an exemplary hierarchical structure of menus of a computer-based application, in accordance to an embodiment of the present invention.

FIG. 4 shows an exemplary hierarchical structure of menus, in accordance to an embodiment of the present invention and should not be considered to limit the scope of the present invention to the exact structure only. At the tab bar level, there are three menu options—menu option-1, menu option-2, and menu option-3. Each of these menu options cannot be null. In other words, each menu option at the tab bar level will have menus or menu options at the hierarchical level(s) under it. A menu option at the tab bar level can have at least one menu or menu option under it at the first-LHN level. For example, menu option-1 has menu-1 and menu option-4 under it at the first-LHN level. Each menu option at the first-LHN level has at least one menu under it at the second-LHN level. For example, menu option-4 has two menus, menu-3 and menu-4, under it at the second-LHN level. The above mentioned hierarchical structure, in accordance to various embodiments of the present invention, is defined to be of up to three levels. For example menu option-1 and menu-1 form a two-level hierarchical structure. On the contrary, menu option-2, menu option-5, and menu-5 form a three-level hierarchical structure. As described in FIG. 4, the menus available in application 102 under each functionality, irrespective of the hierarchy of menus defined in application 102, are identified and then configured in a hierarchy with up to three levels for presentation in the Web portal, in accordance to the various embodiments of the present invention.

Figure 5:
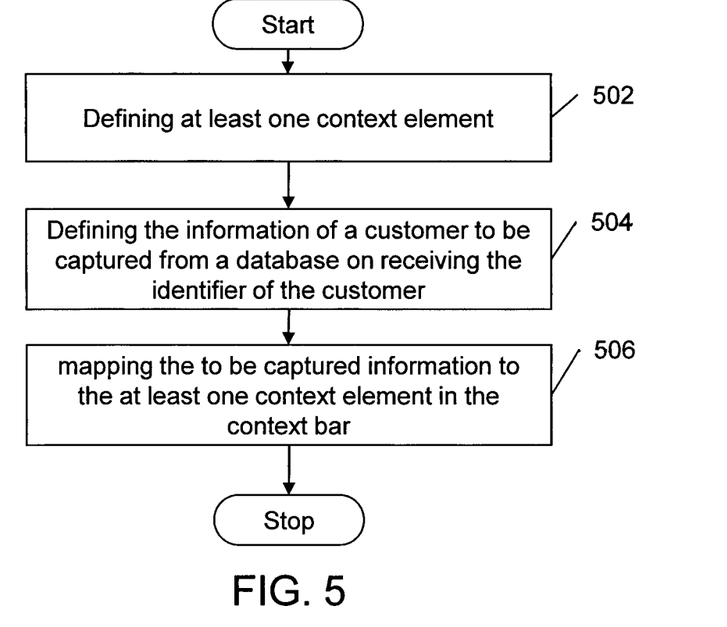
FIG. 5 is a flowchart depicting the process of defining a context bar, in accordance to an embodiment of the present invention.

The step of defining the context bar is described in detail in FIG. 5. At 502, at least one context element in the context bar is defined. Defining the context element includes defining a name of the context element, the type of information captured in the context element, and whether it should be displayed in the context bar on Web portal 104. For example, in case of a banking application and online banking portal, the context elements can be "customer ID", "account ID", "customer name", and "investment ID". The type of information includes, but not limited to, characters, date, string, and numbers. For example, customer ID, account ID and investment ID are "number" type, customer name is "string" type. At 504, the information to be captured from a database is defined on receiving the identifier of a customer. The identifier of the customer can be the customer ID given by the enterprise to that customer. The identifier of a customer can be other pieces of information and is defined by the enterprise as per the requirement. For example, on receiving the customer ID from the customer, the information to be captured is defined to be the name and the account number of the customer. At 506, the information to be captured is mapped to the relevant context element. Continuing with the same example, the name and the account number to be captured from the database will be mapped onto context elements "customer name" and "account ID", respectively.

Figure 6:
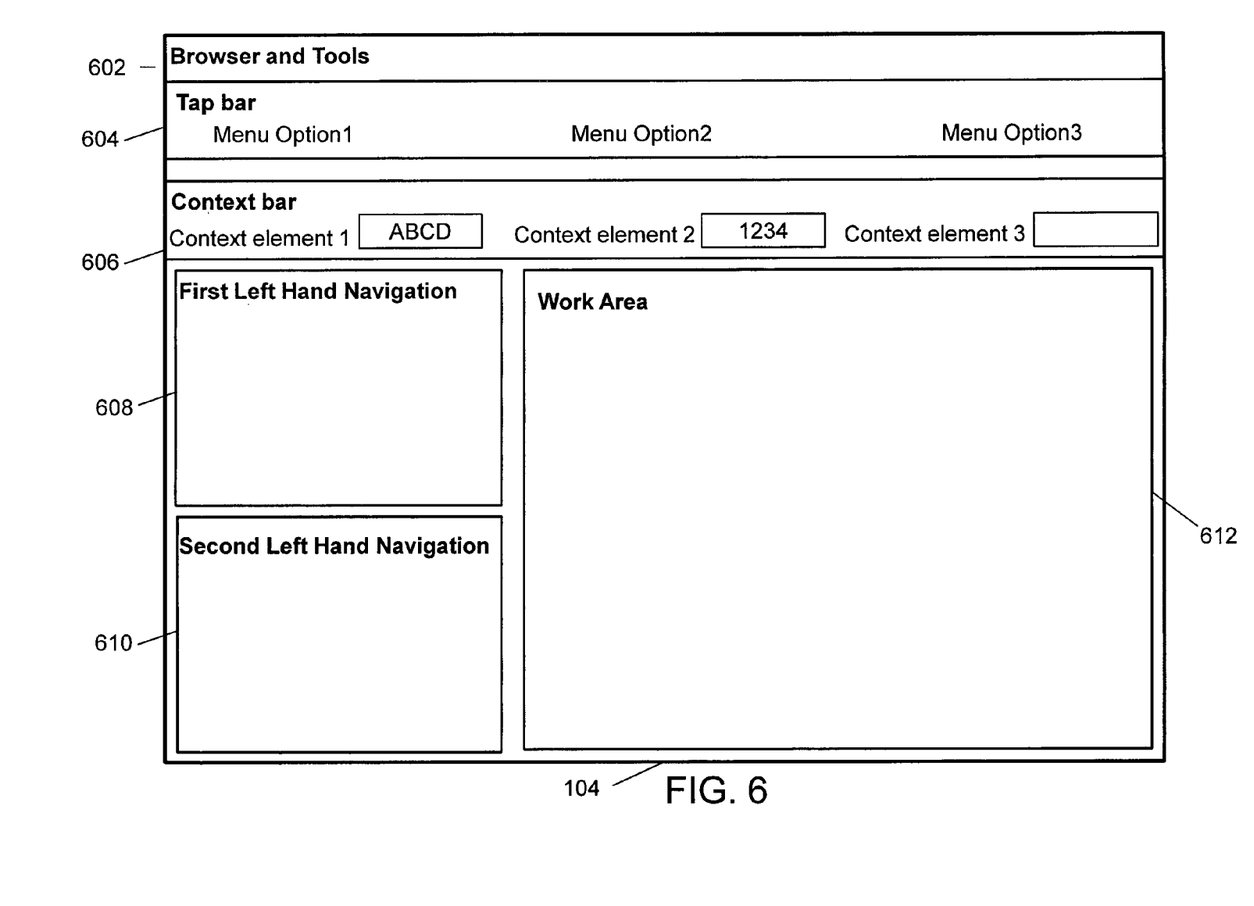
FIG. 6 is a block diagram of the user interface of the Web portal, in accordance to various embodiments of the present invention.

The user interface of Web portal 104 configured as described with reference to FIGS. 2, 3, 4, and 5 is represented in FIG. 6. FIG. 6 shows a block diagram view of the user interface of Web portal 104, in accordance to various embodiments of the present invention. Similar to any Web-based portal, Web portal 104 has browser and tools 602. Browser and tools 602 help user 106 to navigate. In addition, Web portal 104 contains a tab bar 604, a context bar 606, a first left hand navigation (first LHN) 608, a second left hand navigation 610, and a work area 612. Context bar 606 contains at least one context element, as described in 502 of FIG. 5. Context bar 606 is shown to display three context elements in FIG. 6. Each context element displayed also has a field associated with it that contains the value of the context element. At any moment, the field may contain the value of the context element or can be null in the absence of any value of the context element. For example, consider a case where the information to be captured from a database is defined and mapped onto context element 1 and context element 2, at 504 and 506 of FIG. 5. In such a case, the value of context element 1 and context element 2 is uploaded in Web portal 104, where as the value of context element 3 is null, as shown in FIG. 6. Context bar 606 is not limited to elements displayed in Web portal 104 only. As defined at 502 of FIG. 5, only those context elements are displayed in context bar 606 in the user interface of Web portal 104 which are defined to be displayed at 502 of FIG. 5. Context bar 606 may also contain other context elements which are configured to be displayed in Web portal 104. Tap bar 604 includes menu options that are classified at the tab bar level in the hierarchical structure of menus, as defined in FIG. 4. Choosing a menu option in tab bar 604 displays the menu(s) and menu option(s) in first left-hand navigation (first LHN) 608 that are at the first LHN level in the hierarchy under the chosen menu option. Similarly, choosing a menu or menu option displayed in first LHN 608, displays the menu(s) in second left-hand navigation (second LHN) 610 that are under the chosen menu or menu option in the hierarchy. A menu chosen from first LHN 608 or second LHN 610 is displayed in work area 612.

Figure 7:
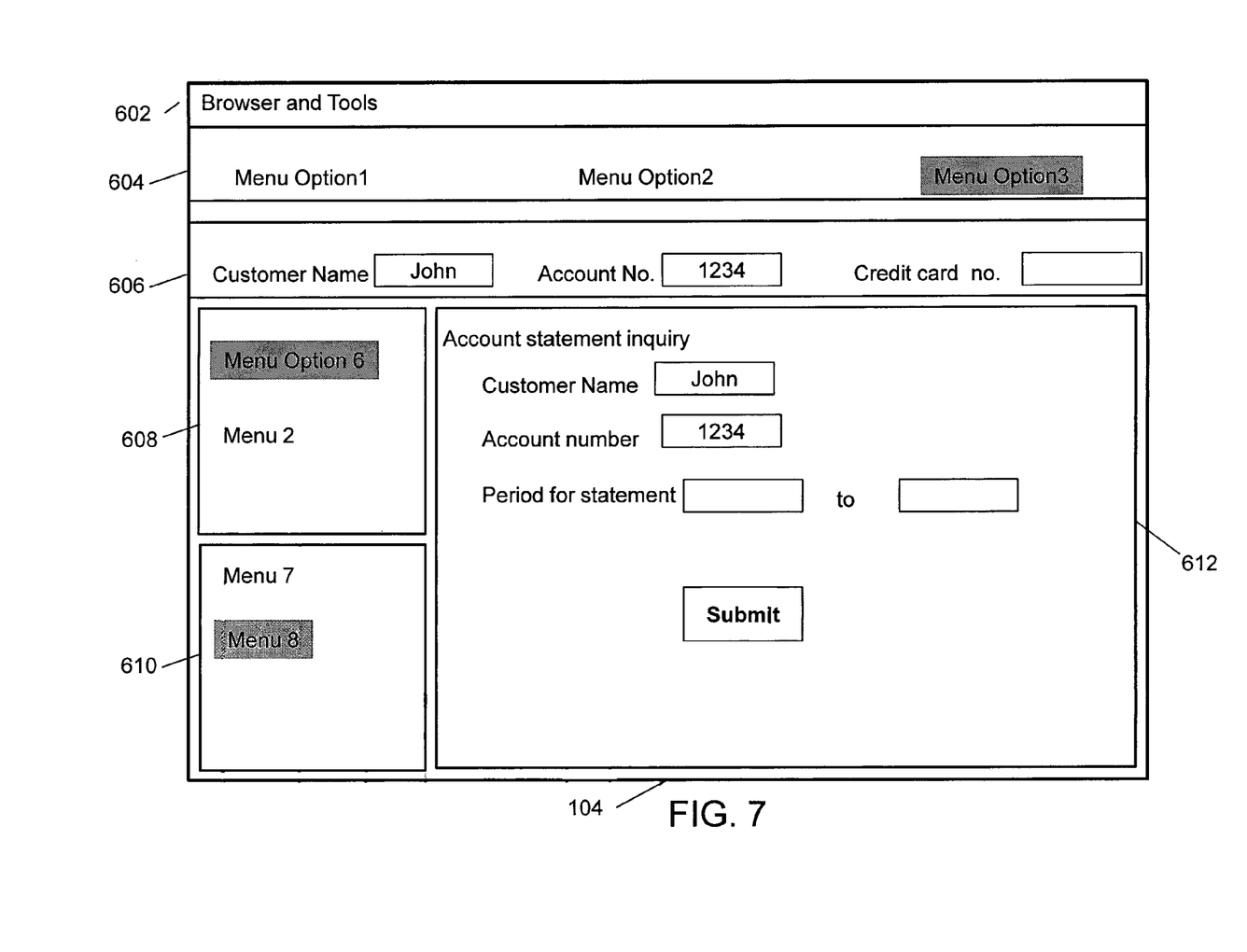
FIG. 7 is a block diagram of the user interface of the Web portal, configured as per the menus and menu options shown in FIG. 4, in the scenario when the user chooses menu 8 after choosing menu option 3 in a tab bar and menu option 6 in a first left hand navigation, in accordance to an embodiment of the present invention.

An example of the user interface of Web portal 104, configured as per the menus and menu options shown in FIG. 4, is shown in FIG. 7 in the scenario when user 106 chooses menu 8 after choosing Menu option 3 in tab bar 606 and menu option 6 in first LHN 608. As shown in FIG. 7, menu option 3 is chosen in tab bar 604. The chosen status of the menus and menu options is shown by highlighting, the background of the menu and menu option for representation. On choosing menu option 3, first LHN 608 displays the menu(s) and menu option(s) under menu option 3 at the first LHN level. Therefore, menu option 6 and menu 2 are displayed in first LHN 608. As shown in FIG. 7, menu option 6 is chosen by user 106. Once menu option 6 is chosen, the menus under menu option 6 at the second LHN level are displayed in second LHN 610. Therefore, menu 7 and menu 8 are displayed in second LHN 610. Once user 106 chooses menu 8, the content of menu 8 is displayed in work area 612.

In the above example, if user 106 chooses menu 2 in first LHN 608 instead of menu option 6, the content of menu 2 will be displayed in work area 612 and second LHN 610 will remain blank. This is because menu 2 is a menu in itself and does not contain any menu under it at the second LHN level, as shown in the hierarchy represented in FIG. 4.

Figure 8:
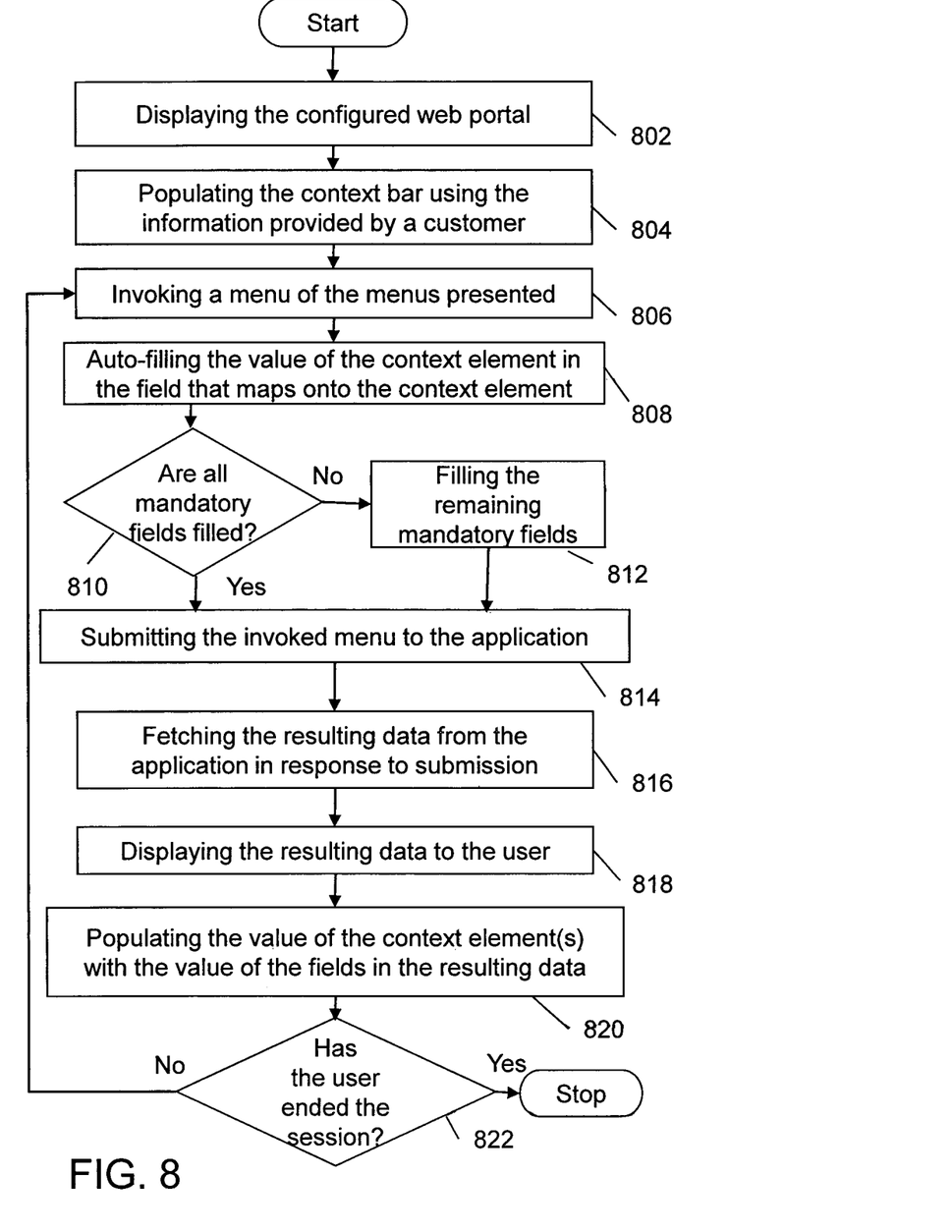
FIG. 8 is a flowchart depicting the method for using the configured Web portal, in accordance to an embodiment of the present invention.

The method of using Web portal 104 configured using the above mentioned method is shown in FIG. 8. At 802, Web portal 104 is displayed to user 106. At 804, context bar 606 is populated using the information provided by the customer. For example, as shown in FIG. 7 context elements are customer name, account number, and credit card number. As shown in FIG. 7, context bar 606 is populated with the values of customer name and account number, where as the value of credit card number is not populated in context bar. The reason for this is that only customer name and account number are defined to be captured from a database on receiving an identifier from the customer at 504 in FIG. 5. At 806, user 106 invokes a menu based on the request of the customer. For example, FIG. 7 shows that user 106 invokes menu 6, which relates to generating a statement of a bank account. Invoking menu 6 displays the content of the menu in work area 612. Menu 6 contains three fields that are customer name, account number, and period for the bank statement. At 808, the values of populated context elements are auto filled in the fields of the invoked menu. For example, if customer name and account number fields of menu 6 are mapped onto the corresponding context element and auto filling feature is enabled for menu 6, at 208 of FIG. 2, the value of the mapped context element is automatically filled in these two fields in menu 6. As shown in FIG. 7, "John" is auto-filled in the customer name field and "1234" is auto-filled in account number field of menu 6. At 810, it is checked if all mandatory fields in the invoked menu are filled. If all mandatory fields are filled, the method moves to 814, else the method moves to 812. At 812, user 106 fills the remaining mandatory fields of the invoked menu. For example, menu 6 has three mandatory fields of which two fields are auto-filled using the values from context bar 606 and the period of statement field is filled by user at 812. Once all mandatory fields are filled, menu is submitted to application 102 at 814. If all mandatory fields are auto-filled from context bar 606, the menu is auto-submitted to application 102 and user 106 is directly taken to the resulting data page. Therefore, user 106 directly gets to see the results on invoking a menu, without providing any further input. On the contrary, if all mandatory fields of the invoked menu are not filled at 808, user 106 enters the value of remaining mandatory fields at 812 and submits the information to application 102 at 814. At 816, application 102 returns the resulting data in response to submission of the menu. At 818, the resulting data is displayed to user 106 on Web portal 104. At 820, the value of the context element(s) is populated or updated if any field of the resulting data is mapped with the context element(s).

Figure 9:
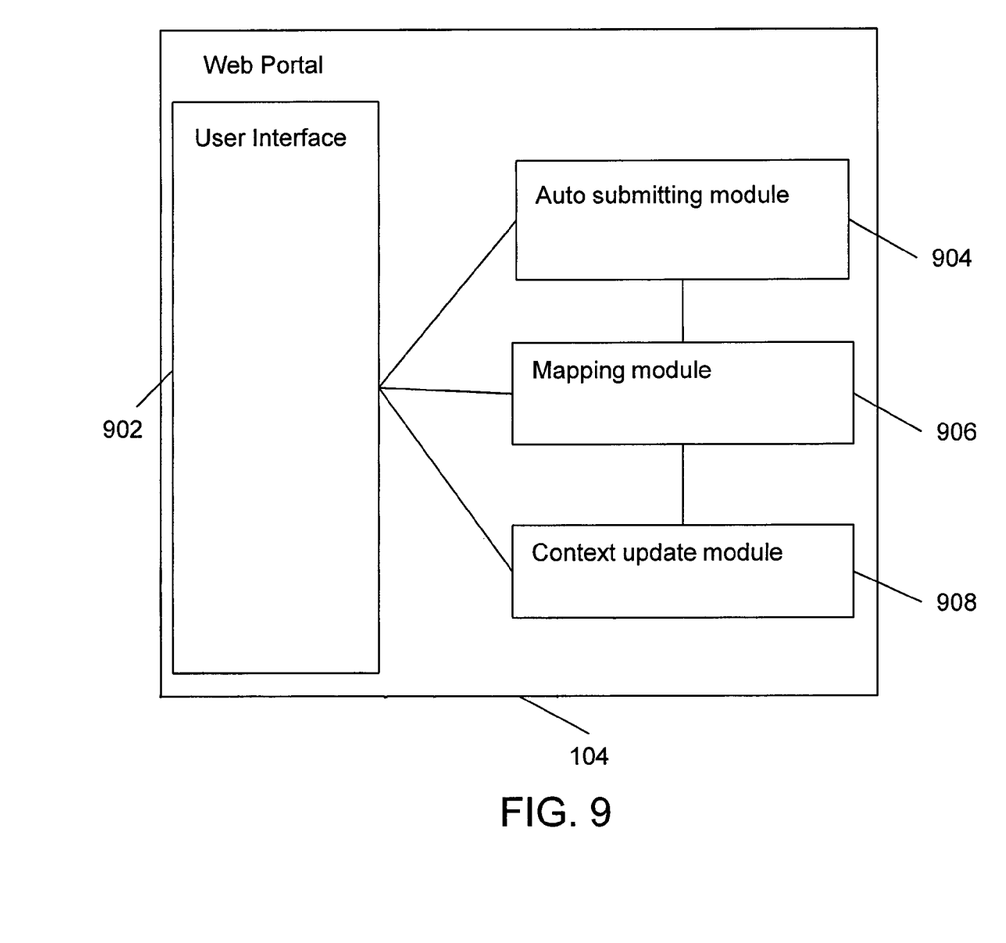
FIG. 9 is a block diagram of the Web portal, in accordance to various embodiments of the present invention.

FIG. 9 is a block diagram of Web portal 104. Web portal 104 includes a user interface 902, an auto-submitting module 904, a mapping module 906, and a context update module 908. User interface 902 is an interface for user 106. User interface 902 presents browser and tools 602, tab bar 604, context bar 606, first LHN 608, second LHN 610, and work area 612 for presenting menus, as shown in FIGS. 6 and 7. Mapping module 906 stores the mapping between context elements and fields in various menus present in application 102. Auto-submitting module 904 checks the mapping between context elements and the currently invoked menu using the mapping stored in mapping module 906. If mapping between any context element and any field of the invoked menu is identified, auto-submitting module 904 auto-fills the value of the context element in that field. Auto-submitting module 904 also submits the invoked menu automatically to application 102 if all mandatory fields of the invoked menu are filled. Application 102 provides data in response to submitting the menu to application 102. Context update module 908 checks, using the mapping stored in mapping module 906, if any field in the resulting data maps on to any context element in the context bar. If a mapping is identified between a context element and a field in the resulting data, context update module 908 updates the value of the context element with the value of the mapping field from the resulting data. The context bar is thus updated based on the new information captured about the customer. Thereafter, this information in the context bar is used when any other menu is invoked by user 106.

The method, the system, and the computer program product described above have a number of advantages. The system enables enterprises to develop user interfaces for any application without much effort and cost. The method enables development of user interfaces without the developers needing to understand the framework or without any technical intervention in application 102. Thus, the system and the method allow development of user interfaces of applications without coding. Also, the system, the method, and the computer program product allow a user to navigate efficiently between menus in application 102. Another advantage associated with the present invention is that minimal input is required from user 106 to fill in information in menus. The auto-submitting and auto-filling features provided in the present invention support user 106 not only to navigate efficiently, but also to get a faster response from application 102 with minimal manual input. Thus, the response time to provide the required data to the customer is greatly reduced. Fast and efficient handling of customer's queries results in customer's delight and higher satisfaction, which benefits the overall business of enterprise 100.

The system for configuring Web portal software for a computer-based application using one or more menus available in the computer-based application, as described in the present invention or any of its modules/components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit, and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive and an optical disk drive. The storage device can also be other similar means for loading computer programs or other program instructions into the computer system. The computer system also includes a communication unit, which enables the computer to connect to other databases and the Internet through an. Input/Output (I/O) interface. The communication unit also enables the transfer and reception of data from other databases. The communication unit may include a modem, an Ethernet card, or any similar device which enable the computer system to connect to databases and networks such as Local Area Network (LAN), Metropolitan Area Network (MAN), Wide Area Network (WAN), and the Internet. The computer system facilitates inputs from a user through an input device, accessible to the system through an I/O interface.

The computer system executes a set of program instructions that are stored in one or more storage elements to process the input data. The storage elements may also hold data or other information as desired. The storage element may be in the form of an information source or a physical memory element present in the processing machine.

The present invention may also be embodied in a computer program product for configuring Web portal software for a computer-based application using one or more menus available in the computer-based application. The computer program product includes a computer-usable medium/a computer readable storage medium having a set program instructions comprising a computer readable program code for configuring Web portal software for a computer-based application using one or more menus available in the computer-based application. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions, and equivalents will be apparent to those skilled in the art without departing from the spirit and scope of the invention, as described in the claims.

What is claimed is:

1. A method for configuring at least one web portal software for a computer based application using one or more menus available in the computer based application, the method comprising:
    identifying and classifying, with a web portal management computing device, one or more menus available in a computer based application according to functionalities;
    configuring, with the web portal management computing device, at least one of the one or more menus classified under one of the functionalities in a hierarchical structure for presenting on at least one web portal, wherein each of the at least web portal corresponds to one of the functionalities of the computer based application;
    defining, with the web portal management computing device, a context bar for the at least one web portal, wherein the defining the context bar further comprises defining at least one context element;
    defining, with the web portal management computing device, a mapping of at least one field of one of the one or more menus presented under the at least one web portal with the at least one context element; and
    configuring, with the web portal management computing device, filling of at least one field of an invoked one of a first menu, a second menu, or a third menu of the one or more menus with a value of the at least one context element being mapped onto the field of the of the first menu, the second menu, or the third menu, submitting the information to a computer based application through the auto-filled menu, when all the mandatory fields of the invoked one of the first menu, the second menu, or the third menu are auto-filled; and updating the value of the at least one context element.

2. The method of claim 1, wherein the configuring the at least one of the one or more menus classified one of the functionalities in the hierarchical structure for presentation in the at least one web portal further comprises:
    configuring, with the web portal management computing device, menu options at a first level of the hierarchical structure in a tab bar;
    defining, with the web portal management computing device, an order of display for the configured menu options in the tab bar;
    configuring, with the web portal management computing device, at least one of menu or menu option for display in a first navigation on the at least one web portal, wherein the at least one menu or menu option is configured under one of the at least one menu option in the tab bar;
    defining, with the web portal management computing device, an order of display for the configured at least one menu or menu option in the first navigation;
    configuring, with the web portal management computing device, at least one menu for display in a second navigation on the web portal, wherein the at least one menu is configured under one of the at least one menu option in the first navigation; and
    defining, with the web portal management computing device, an order of display for the configured at least one menu in the second left hand navigation.

3. The method of claim 1 wherein the defining mapping of the at least one field of one of the one or more menus presented under the web portal with one of the at least one context element further comprises specifying for each configured menu when an auto-filling feature is to be enabled.

4. The method of claim 1, wherein the defining the context bar further comprises:
    defining, with the web portal management computing device, information of a customer to be captured from a database on receiving the identifier of the customer; and
    mapping, with the web portal management computing device, the to be captured information to the at least one context element in the context bar.

5. The method of claim 1, wherein the defining each of the at least one context element further comprises specifying when the context element is to be displayed in the web portal.

6. The method of claim 1 further comprising:
    displaying, with the web portal management computing device, the configured web portal;
    populating, with the web portal management computing device, the context bar using input information, wherein the information is the value of the at least one context element;
    invoking, with the web portal management computing device, one of the one or more menus in the web portal in response to a received request;
    auto-filling, with the web portal management computing device, the value of the context element in the at least one field, wherein the context element is mapped onto the at least one field when an auto-filling feature is enabled for the invoked one of the one or more menus;
    auto-submitting, with the web portal management computing device, the invoked one of the one or more menus to the computer based application menu when all the fields auto-filled in the invoked one of the one or more menus form the mandatory fields of the invoked one of the one or more menus;
    fetching, with the web portal management computing device, the resulting data from the computer based application in response to the auto-submission;
    displaying, with the web portal management computing device, the resulting data on the web portal; and
    populating, with the web portal management computing device, the value of one of more of the at least one context element with the value of the one or more fields in the resulting data based on a pre-defined condition.

7. The method of claim 6 further comprising populating, with the web portal management computing device, the context bar with the information given by the customer.

8. The method of claim 6 further comprising populating, with the web portal management computing device, the context bar with the information pre-defined to be captured from a database using the information given by the customer; wherein the information given by the customer further comprises an identifier of the customer.

9. The method of claim 6 wherein the pre-defined condition is when any field in the resulting data is being mapped on the one of the at least one context element, wherein the value of the one of the at least one context element is populated with the value of the field mapping onto the one of the at least one context element.

10. A web portal management computing device comprising:
a memory; and
a processor coupled to the memory and configured to be capable of executing programmed instructions stored in the memory to:
identify and classify menus available in an application according to functionalities;
configure each of the classified menus under the corresponding one of the functionalities in a hierarchical structure for presentation in at least one web portal;
define a context bar for at least one context element in the context bar of the web portal;
define a mapping of at least one field of one or more menus presented under the web portal with the at least one context element; and
configure filling of at least one field of an invoked one of a first menu, a second menu, or a third menu of the one or more menus with a value of the at least one context element being mapped onto the field of the of the first menu, the second menu, or the third menu, submitting the information to a computer based application through the auto-filled menu, when all the mandatory fields of the invoked one of the first menu, the second menu, or the third menu are auto-filled; and updating the value of the at least one context element.

11. A non-transitory computer readable medium having stored thereon instructions, comprising machine executable code which when executed by a processor, causes the processor to perform steps comprising:
providing a user interface comprising: a context bar having at least one context element; a tab bar comprising at least one of a first menu or a first menu option, a first navigation element comprising at least one of second menu or a second menu option under the first menu option of the tab bar; a second navigation element comprising at least one third menu under the second menu option of the first navigation element; and a work area configured for displaying an invoked one of the first menu, the second menu, or the third menu configured to display resulting data from a computer based application;
storing a mapping between the at least one context element and at least one field in at least one of the first menu, the second menu, or the third menu on the user interface;
filling at least one field of the invoked one of the first menu, the second menu, or the third menu with a value of the context element being mapped onto the field of the of the first menu, the second menu, or the third menu and for submitting the information to the computer based application through the auto-filled menu, in case all the mandatory fields of the invoked one of the first menu, the second menu, or the third menu are auto-filled; and
updating the value of the at least one context element.

12. The medium of claim 11, wherein the context bar further comprises;
at least one other context element not being displayed in the user interface; and
at least one other value for the at least one other context element not being displayed in the user interface.

13. The medium of claim 11, further comprising updating the value of the at least one context element using the information provided by the customer.

14. The medium of claim 13, further comprising updating the value of the at least one context element with the information pre-defined to be captured from a database using the information provided by the customer, wherein the information provided by the customer is the identifier of the customer.

15. The medium of claim 14, further comprising updating the value of the at least one context element with the information in the resulting data from the computer based application.

16. A non-transitory computer readable medium having stored thereon instructions for configuring at least one web portal for an application using one or more menus available in the application, comprising machine executable code which when executed by a processor, causes the processor to perform steps comprising:
identifying and classifying the one or more menus available in the application according to functionalities;
configuring at least one of the one or more menus classified under one of the functionalities in a hierarchical structure for presenting on the at least one web portal, wherein each web portal corresponds to one of the functionalities of the application;
defining a context bar for the web portal, wherein the defining the context bar comprises defining at least one context element;
defining mapping of at least one field of one of the one or more menus presented under the web portal to one of the at least one context element; and
configure filling of at least one field of an invoked one of a first menu, a second menu, or a third menu of the one or more menus with a value of the at least one context element being mapped onto the field of the of the first menu, the second menu, or the third menu, submitting the information to a computer based application through the auto-filled menu, when all the mandatory fields of the invoked one of the first menu, the second menu, or the third menu are auto-filled; and updating the value of the at least one context element.

17. The medium of claim 16 wherein the machine executable code which, when executed by the processor, causes the processor to perform steps further comprising:
configuring the menu options at a first level of the hierarchical structure in a tab bar;
defining an order of display for the configured menu options in the tab bar;
configuring at least one of a first menu or a first menu option for display in a first left hand navigation on the at least one web portal, wherein the at least one menu or menu option is configured under one of the at least one menu option in the tab bar; and
defining an order of display for the configured at least one menu or menu option in the first left hand navigation;
configuring at least one menu for display in a second left hand navigation on the web portal, wherein the at least one menu is configured under one of the at least one menu option in the first left hand navigation; and
defining an order of display for the configured at least one menu in the second left hand navigation.

18. The medium of claim 16 wherein the defining mapping of the at least one field of one or more menus presented under the web portal with one of the at least one context element comprising specifying for each configured menu when the auto-filling feature is to be enabled.

19. The medium of claim 16, wherein the defining the context bar further comprises:
for defining the information of a customer to be captured from a database on receiving the identifier of the customer; and
for mapping the to be captured information to the at least one context element in the context bar.

20. The medium of claim 16, wherein the defining each of the at least one context element comprises specifying menu when the context element is to be displayed in the web portal.

21. The medium of claim 16 further comprising:
displaying the configured web portal;
populating the context bar using the information provided by a customer, wherein the information is being the value of the at least one context element;
invoking one of the one or more menus in the web portal in response to a received request;
auto-filling the value of the context element in the at least one field, wherein the context element is mapped onto the at least one field, menu when an auto-filling feature is enabled for the invoked one of the one or more menus;
auto-submitting the invoked one of the one or more menus to the application menu when all the fields auto-filled in the invoked one of the one or more menus form the mandatory fields of the invoked one of the one or more menus;
fetching the resulting data from the application in response to the auto-submission;
displaying the resulting data on the web portal; and
populating the value of the mapping context element with the value of the field in the resulting data.

22. The medium of claim 21 further comprising populating, with the web portal management computing device, the context bar with the information given by the customer.

23. The medium of claim 21 further comprising populating, with the web portal management computing device, the context bar with the information pre-defined to be captured from a database using the information given by the customer, wherein the information given by the customer further comprises an identifier of the customer.

* * * * *